(12) United States Patent
Gerber et al.

(10) Patent No.: US 8,166,160 B2
(45) Date of Patent: Apr. 24, 2012

(54) SYSTEM AND METHOD FOR FLEXIBLE CLASSIFCATION OF TRAFFIC TYPES

(75) Inventors: Alexandre Gerber, Madison, NJ (US);
Oliver Spatscheck, Randolph, NJ (US);
Carsten Lund, Berkeley Heights, NJ (US); Frederick True, Bloomsbury, NJ (US); Ajay Todimala, Madison, NJ (US); Jeffrey Erman, Morristown, NJ (US)

(73) Assignee: AT&T Intellectual Property II, LP, Reno, NV (US)

( * ) Notice: Subject to any disclaimer, the term of this patent is extended or adjusted under 35 U.S.C. 154(b) by 303 days.

(21) Appl. No.: 12/329,463

(22) Filed: Dec. 5, 2008

(65) Prior Publication Data
US 2010/0146100 A1 Jun. 10, 2010

(51) Int. Cl.
*G06F 15/173* (2006.01)
(52) U.S. Cl. .................. 709/224; 709/223; 709/240
(58) Field of Classification Search .............. 709/223, 709/224, 240
See application file for complete search history.

(56) References Cited

U.S. PATENT DOCUMENTS

| | | | |
|---|---|---|---|
| 6,286,052 B1 | 9/2001 | McCloghrie et al. | |
| 6,483,805 B1 | 11/2002 | Davies et al. | |
| 7,113,990 B2 | 9/2006 | Scifres et al. | |
| 7,225,271 B1 | 5/2007 | DiBiasio et al. | |
| 7,263,065 B1 | 8/2007 | Cahn | |
| 7,320,029 B2 | 1/2008 | Rinne et al. | |
| 7,346,677 B1 | 3/2008 | Mohaban et al. | |
| 7,359,986 B2 | 4/2008 | Madhavapeddi et al. | |
| 7,474,615 B2* | 1/2009 | Pirzada et al. | 370/230 |
| 2007/0008978 A1* | 1/2007 | Pirzada et al. | 370/395.43 |
| 2008/0002692 A1* | 1/2008 | Meylan et al. | 370/390 |
| 2008/0043620 A1 | 2/2008 | Ye | |
| 2008/0077705 A1 | 3/2008 | Li et al. | |
| 2009/0122699 A1* | 5/2009 | Alperovitch et al. | 370/230 |
| 2011/0019574 A1* | 1/2011 | Malomsoky et al. | 370/252 |
| 2011/0228744 A1* | 9/2011 | Cai et al. | 370/331 |

* cited by examiner

*Primary Examiner* — Mohamed Wasel
(74) *Attorney, Agent, or Firm* — Larson Newman, LLP

(57) ABSTRACT

A system includes an information storage module and an inspection module. The information storage module is configured to store a plurality of tags. Each tag is associated with a known set of traffic types of a plurality of known sets of traffic types. The inspection module is configured to compare a traffic flow to a set of traffic types to determine a matching set of traffic types, request a tag from the information storage module, and mark the traffic flow with the tag. The tag corresponds to the matching set of traffic types.

16 Claims, 5 Drawing Sheets

SYSTEM AND METHOD FOR FLEXIBLE CLASSIFCATION OF TRAFFIC TYPES

FIELD OF THE DISCLOSURE

The present disclosure generally relates to communications networks, and more particularly relates to flexible application classification

BACKGROUND

Communications networks, such as the Internet, carry a wide variety of traffic. For example, the Internet carries email, web traffic, Voice-over-IP (VoIP) traffic, multimedia traffic, and many other types of traffic. Different types of traffic place different demands on the network, as well as presenting different security challenges. For example, VoIP and other real-time data streams require packets to be consistently delivered with relatively short delays, whereas email traffic can tolerate longer delays with much more variability between packets. Additionally, several techniques to reduce unsolicited commercial email (spam) rely on recognizing and blocking email traffic from illegitimate sources. Efficient use of the network for all data types requires recognizing the needs of each traffic flow as it traverses the network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
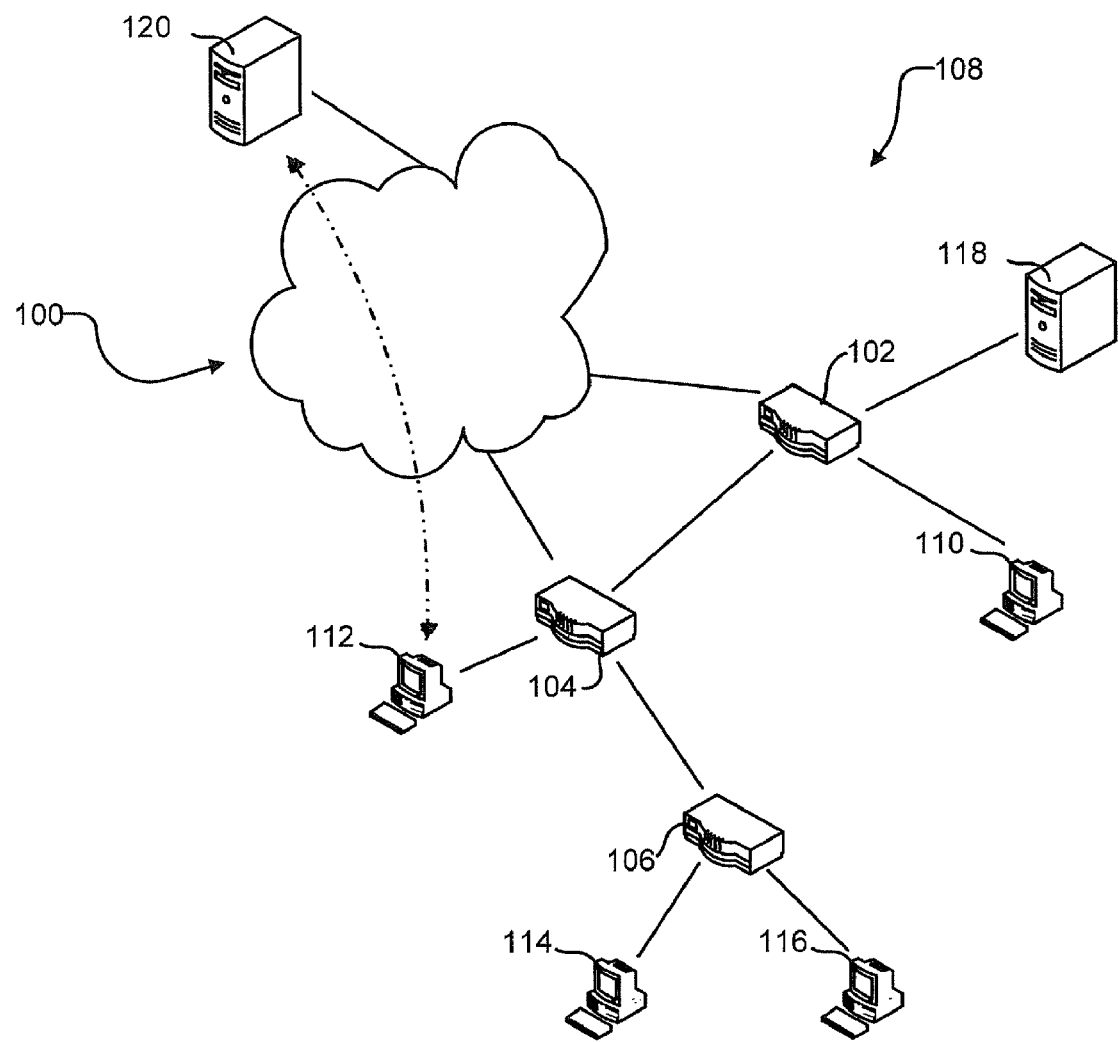
FIG. 1 is a diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphic, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Figure 2:
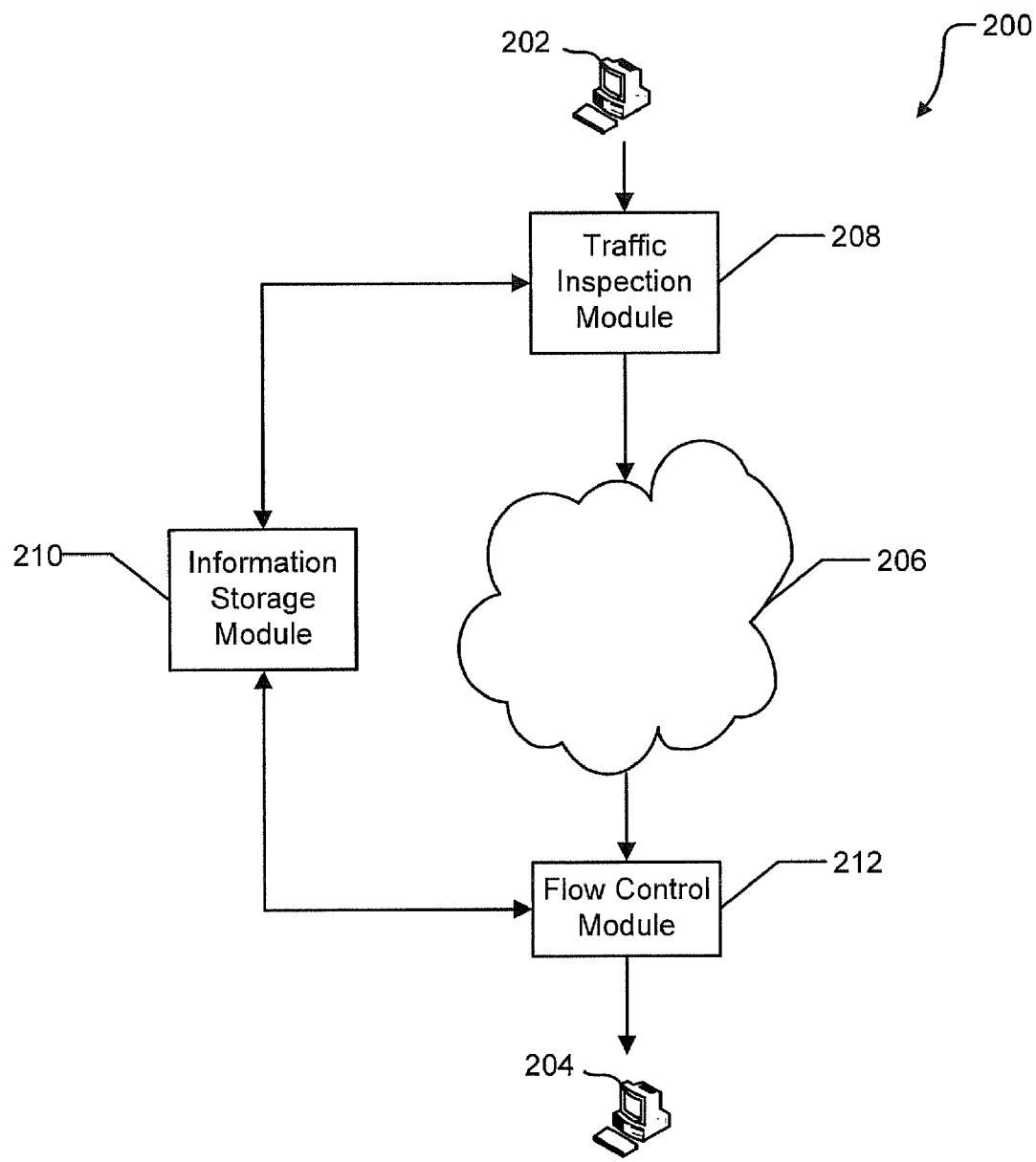
FIG. 2 is a block diagram illustrating a system for classifying network traffic in accordance with one embodiment of the present disclosure.

FIG. 2 shows a system 200 for classifying network traffic based on traffic types. Computer systems 202 and 204 can communicate through communications network 206. Computer systems 202 and 204 can be servers such as DNS server 118 and server 120, or client systems such as client system 110. Traffic from computer system 202 travels to a traffic inspection module 208. The traffic inspection module 208 can be a router, a deep packet inspection probe, or the like. The traffic inspection module 208 can match the traffic to traffic types based on OSI layer 4 information including a port number, transport protocol such as Transmission Control Protocol (TCP), an Internet Protocol (IP) addresses, or any combination thereof. Additionally, the traffic can be matched to traffic types based on OSI layer 7 information including application protocols such as Hypertext Transfer Protocol (HTTP), content types, or any combination thereof. For example, a traffic flow using HTTP to transfer a video stream can be classified as both web traffic and as multimedia traffic. In another example, a video stream may be transferred using a peer-to-peer (P2P) protocol and can be classified as both P2P traffic and as multimedia traffic.

The traffic inspection module can communicate the set of matching traffic types to an information storage module 210. In an embodiment, the information storage module 210 can be a database server. The information storage module 210 can compare a set of matching traffic types to known sets of traffic types, and can provide an application identification (AppID) to the traffic inspection module 208. The AppID can be a value, such as an integer, that represents the complete set of traffic types that match the traffic flow. The traffic inspection module 208 can tag the traffic with the AppID, such as by inserting the AppID into a traffic header. The tagged traffic can traverse the communications network 206 towards computer system 204.

Elsewhere, the traffic can flow through a flow control module 212. The flow control module 212 can be a router, a firewall, or the like. The flow control module 212 can process the traffic based on a type of the traffic. In an embodiment, the traffic control module 212 can prioritize the traffic based on the traffic type. For example, realtime traffic, such as voice-over-IP (VoIP) traffic may receive a high priority, web traffic may receive an intermediate priority, and P2P traffic may receive a low priority. Prioritizing traffic may be used to enhance a quality of service (QoS) for certain traffic types, ensuring that lower priority traffic does not diminish the user experience of higher priority traffic. In another embodiment, the traffic control module 212 can restrict traffic based on the traffic type. For example, the traffic control module 212 can block traffic that matches the signature of a network-based attack such as a Denial of Service (DoS) attack or a worm.

The flow control module 212 can receive a list of AppIDs from the information storage module 210 that includes a traffic type. The flow control module 212 can look for traffic having one of the identified AppIDs, and can process the traffic accordingly. The use of the AppID allows each flow control module 212 to determine which traffic types are significant without losing the information about the other traffic types that may be important to other flow control modules located throughout the communications network 206. For example, one flow control module can distinguish between web and P2P traffic, and another flow control module can distinguish between multimedia and non-multimedia traffic.

By maintaining the list of matching traffic types corresponding to the AppID, the information about all the matching traffic types is preserved and can accessible at various locations throughout the network. Traffic flows can be grouped at one location based on a subset of traffic types by retrieving a group of AppIDs that match the subset of traffic types. This can be done without losing information about other matching traffic types that may be useful elsewhere in the system. Thus, the significance of a traffic type can be different at different locations in the network and the significance as determined at one location is not imposed upon another location through the loss of matching traffic type information.

In an embodiment, the information storage module 210 can track the time since last use for each AppID. When the time since last use of an AppID exceeds a threshold, the AppID can be purged, allowing the AppID to be mapped to another set of traffic types. For example, when the traffic inspection module is updated to distinguish additional traffic types, such as further classifying P2P traffic by P2P protocol, AppIDs recognizing the traffic simply as P2P traffic can become obsolete.

The traffic inspection module 208, the information storage module 210, and the flow control module 212 can be implemented in hardware, software, or any combination thereof. Each module may include one or more computer systems. When a module includes more than one computer system, the functions of the module can be distributed across the multiple computer systems in a symmetric manner where each computer system performs the same type of tasks, or in an asymmetric manner where two computer systems of the module may perform different tasks.

Figure 3:
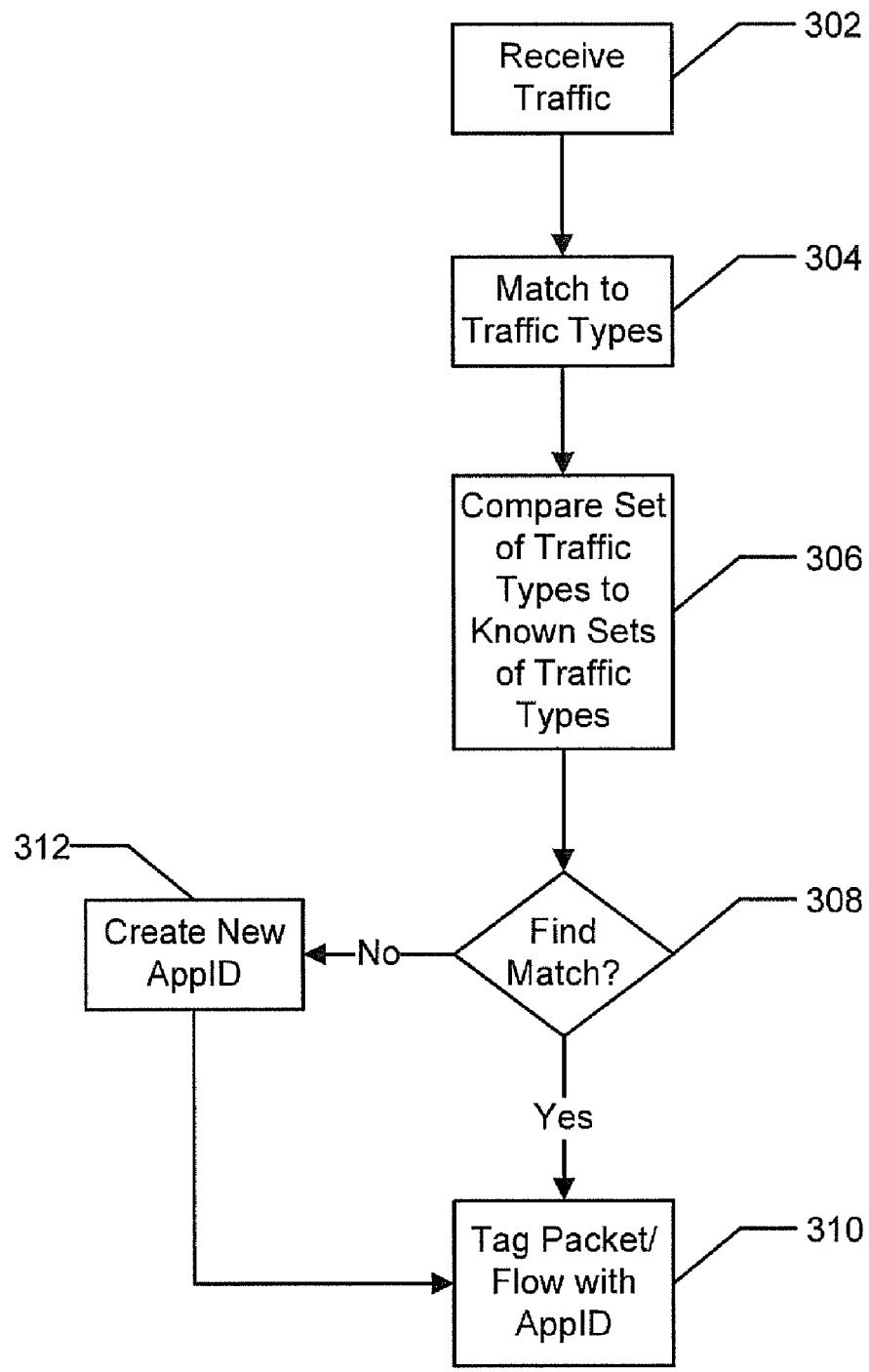
FIG. 3 is a flow diagram illustrating an exemplary method of classifying network traffic.

FIG. 3 illustrates an exemplary method of classifying network traffic. At 302, a traffic inspection module such as traffic inspection module 208 can receive traffic. At 304, the traffic inspection module can match the traffic to a set of traffic types. The traffic types can be based on layer 4 information, layer 7 information, or any combination thereof. At 306, the traffic inspection module can compare the set of traffic types that match the traffic to a plurality of known sets of traffic types. For example, the traffic inspection module can provide the set of traffic types to an information storage module, such as information storage module 210. At 308, the information storage module can determine if the set of traffic types matches a known set of traffic types.

When the set of matching traffic types matches a known set of traffic types, the traffic inspection module can tag the traffic flow with an AppID indicating the set of traffic types that match the traffic, as illustrated at 310. In an embodiment, the information storage module can provide the AppID to the traffic inspection module, and the traffic inspection module can insert the AppID into a packet header of the traffic flow.

Alternatively, when the set of applications signatures does not match a known set of traffic types, the information storage system can generate a new AppID and store the AppID along with the set of traffic types, as illustrated at 312. The traffic inspection module can tag the traffic flow with an AppID, as illustrated at 310.

Figure 4:
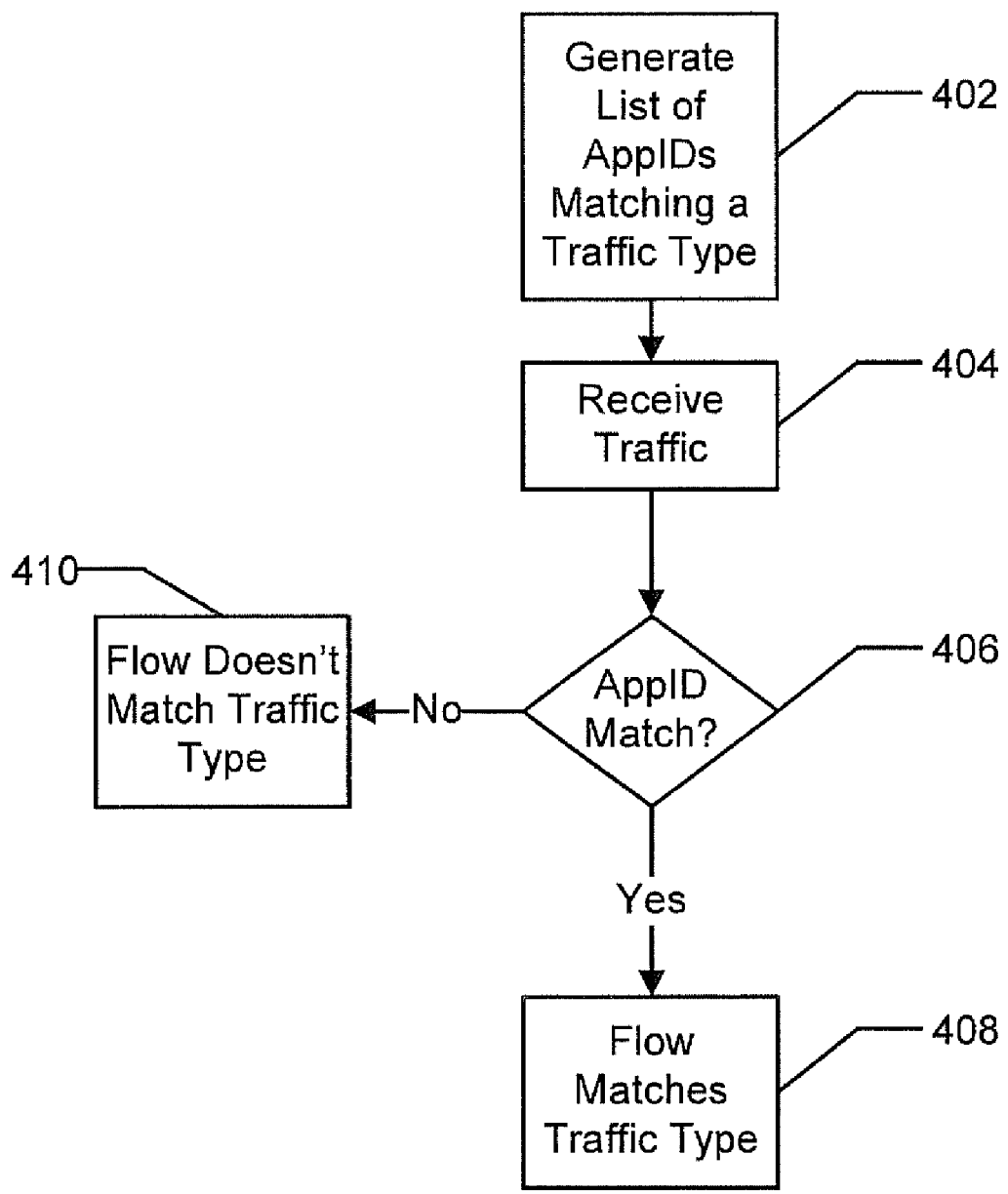
FIG. 4 is a flow diagram illustrating another exemplary method of classifying network traffic.

FIG. 4 illustrates another exemplary method of classifying network traffic. At 402, a flow control module, such as flow control module 212, can retrieve a list of AppIDs that match a traffic type. For example, the flow control module can provide an identifier of the traffic type to an information storage module, such as information storage module 210. The information storage module may return the list of AppIDs that include the traffic type to the flow control module. At 404, the flow control module can receive traffic. At 406, the flow control module can determine if the traffic is tagged with one of the AppIDs from the list of AppIDs. When the AppID matches the list of AppIDs, the flow control module can process the traffic as traffic that matches the traffic type, as illustrated at 408. Alternatively, when the AppID does not match the list of AppIDs, the flow control module can process the traffic as traffic that does not match the traffic type, as illustrated at 410. In an embodiment the flow control module can increase the priority of traffic that matches a VoIP traffic type, and can decrease the priority of traffic that does not match a VoIP traffic type to enhance a QoS for the VoIP traffic.

Figure 5:
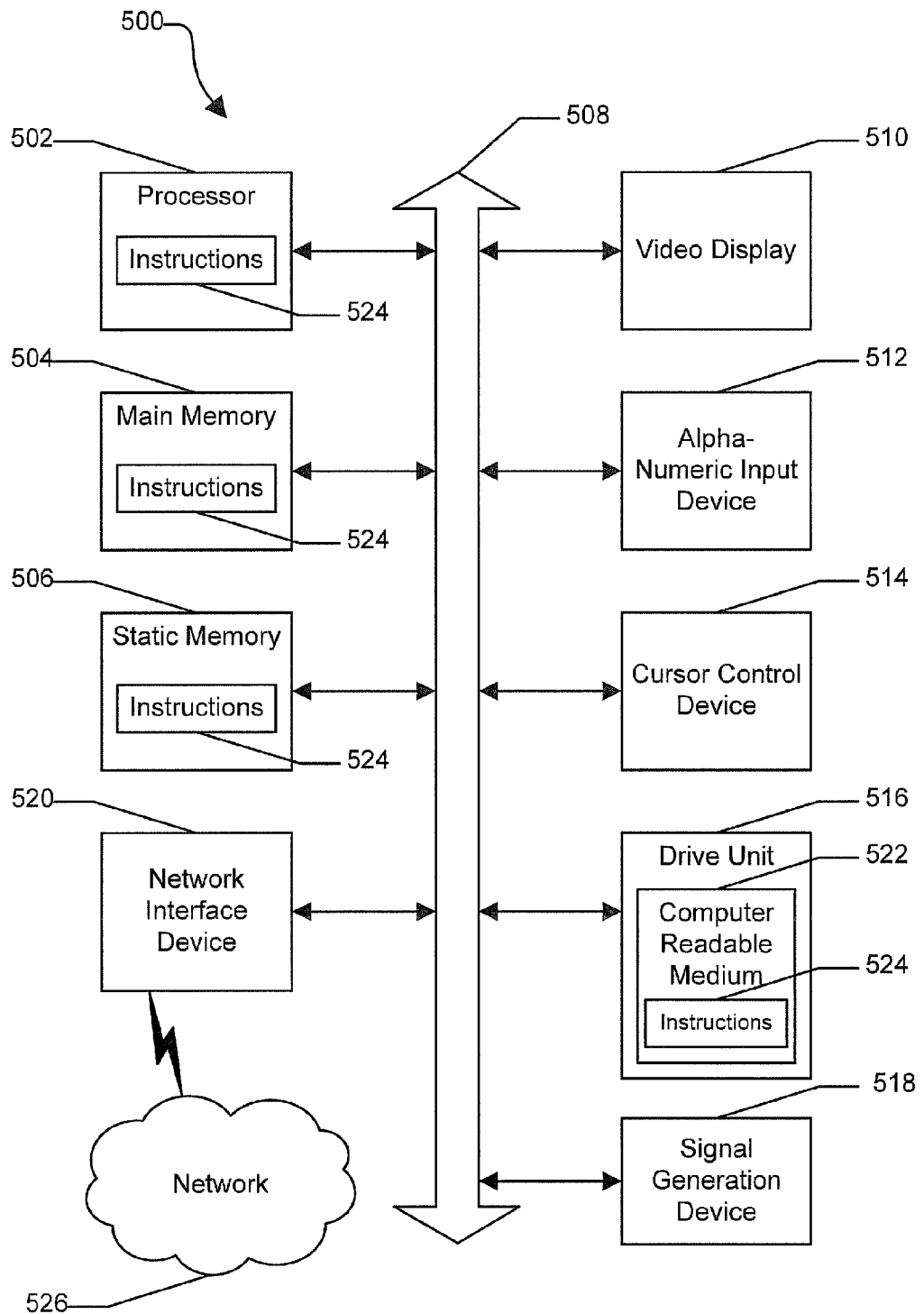
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid-state display, or a cathode ray tube (CRT). Additionally, the computer system 500 may include an input device 512 such as a keyboard, and a cursor control device 514 such as a mouse. Alternatively, input device 512 and cursor control device 514 can be combined in a touchpad or touch sensitive screen. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system comprising:
    an information storage module, of a server, configured to store a plurality of tags in a database of the server, each tag associated with a known set of traffic types of a plurality of known sets of traffic types, and configured to provide a list of application identifications associated with the known set of traffic types; and
    an inspection module configured to:
        compare a traffic flow to the known sets of traffic types to determine a matching set of traffic types;
        request one of the tags from the information storage module, the tag corresponding to the matching set of traffic types; and
        mark the traffic flow with the tag via inserting the tag into a packet header of the traffic flow.

2. The system of claim 1, wherein the information storage module is further configured to track a time since last use of a tag and to purge the tag when the time since last use of the tag exceeds a threshold.

3. The system of claim 1, wherein the information storage module is further configured to generate a new tag when the matching set of traffic types does not correspond to one of the plurality of known sets of traffic types.

4. The system of claim 1, wherein the matching set of traffic types is based on layer 4 information, layer 7 information, or any combination thereof.

5. The system of claim 4, wherein the layer 4 information includes a port number, an Internet Protocol address, a transport protocol, or any combination thereof.

6. The system of claim 4, wherein the layer 7 information includes an application protocol, a content type, or any combination thereof.

7. A network device comprising:
    a processor configured to:
        compare a traffic flow to a set of traffic types to determine a matching set of traffic types;
        identify a tag associated with the matching set of traffic types; and
        mark the traffic flow with the tag via inserting the tag into a packet header of the traffic flow, wherein the tag is associated with an application identification in a list of application identifications associated with the set of traffic types.

8. The system of claim 7, wherein the matching set of traffic types is based on layer 4 information, layer 7 information, or any combination thereof.

9. The system of claim 8, wherein the layer 4 information includes a port number, an Internet Protocol address, a transport protocol, or any combination thereof.

10. The system of claim 8, wherein the layer 7 information includes an application protocol, a content type, or any combination thereof.

11. A system comprising:
    an information storage module, of a server, configured to store a plurality of tags in a database of the server, each tag being an identification of a known set of traffic types of a plurality of known sets of traffic types, and configured to track a time since last use of a tag, to purge the tag when the time since last use of the tag exceeds a threshold, and to map the purged tag to another set of traffic; and
    a flow control module configured to:

receive traffic marked with one of the tags located in a packet header of the traffic;
retrieve information about the set of traffic types associated with the tag;
determine if the traffic matches one of the known sets of traffic types based on the tag; and
process the traffic based on the traffic type.

12. The system of claim 11, wherein the flow control module is configured to process the traffic by prioritizing the traffic, blocking the traffic, limiting the amount of the traffic, limiting the bit rate of the traffic, or any combination thereof.

13. A computer readable medium excluding propagated signals and comprising a plurality of instructions to manipulate a processor, the plurality of instructions comprising:
  instructions to receive traffic marked with a tag located in a packet header of the traffic flow;
  instructions to retrieve a list of application identifications associated a set of traffic types associated with the tag;
  instructions to determine if the traffic matches a traffic type based on the tag being located in the list of application identifications; and
  instructions to processes the traffic based on the traffic type.

14. The computer readable medium of claim 13, wherein the instructions to process the traffic further include instructions to prioritize the traffic, block the traffic, limit the amount of the traffic, limit the bit rate of the traffic, or any combination thereof.

15. A computer readable medium excluding propagated signals and comprising a plurality of instructions to manipulate a processor, the plurality of instructions comprising:
  instructions to store a plurality of tags, each tag associated with a known set of traffic types of a plurality of known sets of traffic types;
  instructions to receive a matching set of traffic types from an inspection module;
  instructions to provide the inspection module with the tag corresponding to the matching set of traffic types;
  instructions to mark traffic with the tag via inserting the tag into a packet header of the traffic flow;
  instructions to receive a traffic type identifier from a flow control module;
  instructions to provide the flow control module with a list of tags corresponding to the traffic type identifier;
  instructions to track a time since last use of the tag;
  instructions to purge the tag when the time since last use of the tag exceeds a threshold; and
  instructions to map the purged tag to another set of traffic.

16. The computer readable medium of claim 15, wherein the plurality of instructions further comprises instructions to generate a new tag when the matching set of traffic types does not match the plurality of known sets of traffic types.

* * * * *